United States Patent
Vemulapalli

(10) Patent No.: US 12,217,546 B2
(45) Date of Patent: Feb. 4, 2025

(54) SPOOF DETECTION USING HEAD POSE TO EYE GAZE CORRESPONDENCE

(71) Applicant: Jumio Corporation, Palo Alto, CA (US)

(72) Inventor: Spandana Vemulapalli, Kansas City, MO (US)

(73) Assignee: Jumio Corporation, Sunnyvale, CA (US)

( * ) Notice: Subject to any disclaimer, the term of this patent is extended or adjusted under 35 U.S.C. 154(b) by 316 days.

(21) Appl. No.: 17/704,927

(22) Filed: Mar. 25, 2022

(65) Prior Publication Data

US 2023/0306789 A1 Sep. 28, 2023

(51) Int. Cl.
*G06V 40/40* (2022.01)
*G06F 3/01* (2006.01)
*G06T 7/20* (2017.01)

(52) U.S. Cl.
CPC .............. *G06V 40/40* (2022.01); *G06F 3/013* (2013.01); *G06T 7/20* (2013.01); *G06T 2207/30201* (2013.01)

(58) Field of Classification Search
USPC ........................................................ 382/103
See application file for complete search history.

(56) References Cited

U.S. PATENT DOCUMENTS

| | | | |
|---|---|---|---|
| 2017/0046583 A1* | 2/2017 | Rodriguez | G06V 40/19 |
| 2017/0048244 A1* | 2/2017 | Loughlin-McHugh | G06V 40/171 |
| 2018/0239955 A1* | 8/2018 | Rodriguez | G06V 40/171 |
| 2020/0320282 A1* | 10/2020 | Boic | G06V 40/45 |

* cited by examiner

*Primary Examiner* — Jacky X Zheng
(74) *Attorney, Agent, or Firm* — Patent Law Works LLP

(57) ABSTRACT

Methods, systems, and computer-readable storage media for determining that a subject is a live person include providing instructions for performing a head movement, capturing a set of images of a subject subsequent to providing the instructions to perform the head movement, determining, from the set of images, a first metric indicative of an amount of change in eye gaze directions of the subject during the head movement, determining, from the set of images, a second metric indicative of a change in head positions of the subject during the head movement, determining, based at least on the first metric and the second metric, a third metric indicative of a likelihood that the subject is a live person, determining that the third metric satisfies a first threshold condition, and in response to determining that the third metric satisfies the first threshold condition, identifying the subject as a live person.

17 Claims, 8 Drawing Sheets

SPOOF DETECTION USING HEAD POSE TO EYE GAZE CORRESPONDENCE

TECHNICAL FIELD

This specification generally relates to security control using image capture devices.

BACKGROUND

Malicious impersonators have been known to attempt to breach the security of face recognition systems by using three-dimensional robotic representations of the face of an actual user. Examples of spoof or alternate representations can include, for example, an image of a person displayed on a high-resolution display device or printed as a photograph. Spoof/liveness detection systems are designed to process images to differentiate between real human users and malicious impersonators intending to breach the security of the systems.

SUMMARY

In one aspect, this document describes a method for controlling access to a secure system based on determining that a subject is a live person. The secure system is a system to which access is controlled, e.g. by using authentication and/or authorization of one or more subjects trying to access the system. The method includes providing instructions for performing a head movement, capturing a set of images of a subject subsequent to providing the instructions to perform the head movement, determining, from the set of images, a first metric indicative of an amount of change in eye gaze directions of the subject during the head movement, determining, from the set of images, a second metric indicative of a change in head positions of the subject during the head movement, determining, based at least on the first metric and the second metric, a third metric indicative of a likelihood that the subject is a live person, determining that the third metric satisfies a first threshold condition, and in response to determining that the third metric satisfies the first threshold condition, identifying the subject as a live person.

In another aspect, this document describes a system for controlling access to a secure system based on determining that a subject is a live person. The system includes one or more computers; and one or more computer memory devices interoperably coupled with the one or more computers and having tangible, non-transitory, machine-readable media storing one or more instructions that, when executed by the one or more computers, perform various operations. The operations include providing instructions for performing a head movement, capturing a set of images of a subject subsequent to providing the instructions to perform the head movement, determining, from the set of images, a first metric indicative of an amount of change in eye gaze directions of the subject during the head movement, determining, from the set of images, a second metric indicative of a change in head positions of the subject during the head movement, determining, based at least on the first metric and the second metric, a third metric indicative of a likelihood that the subject is a live person, determining that the third metric satisfies a first threshold condition, and in response to determining that the third metric satisfies the first threshold condition, identifying the subject as a live person.

In another aspect, this document describes one or more non-transitory computer-readable storage devices coupled to one or more processors and having instructions stored thereon which, when executed by the one or more processors, cause the one or more processors to perform various operations. The operations include providing instructions for performing a head movement, capturing a set of images of a subject subsequent to providing the instructions to perform the head movement, determining, from the set of images, a first metric indicative of an amount of change in eye gaze directions of the subject during the head movement, determining, from the set of images, a second metric indicative of a change in head positions of the subject during the head movement, determining, based at least on the first metric and the second metric, a third metric indicative of a likelihood that the subject is a live person, determining that the third metric satisfies a first threshold condition, and in response to determining that the third metric satisfies the first threshold condition, identifying the subject as a live person.

Implementations of the above aspects can include one or more of the following features. The instructions provide an optical target that is displayed by a device screen for the subject to look at, while the set of images is being captured. The first metric is substantially proportional to the amount of change in eye gaze directions. The second metric is substantially proportional to the amount of change in head positions during the head movement. The third metric is a weighted sum of (i) the second metric and (ii) an inverse of the first metric. The third metric is a weighted sum of (i) the second metric and (ii) the first metric. The instructions to perform the head movement include instructions to perform one of: a yaw, a pitch or a roll of the head of the subject. The operations can include determining a presence of at least one transitional state as a head position changes from an initial head position to a final head position and determining that the head movement between the initial head position and the final head position exceeds a second threshold condition.

Particular implementations of the subject matter described in this disclosure can be implemented so as to realize one or more of the following advantages. The technology described herein can be used to reduce vulnerabilities of spoof detection systems that separately rely on head pose or eye gaze to determine a liveness of a subject. For example, in order to make a spoof image appear like a properly captured selfie-image, the spoof image can be manipulated to include changes in head pose that would appear as being dissociated from eye gaze. The technology described herein addresses this vulnerability by tracking head poses in conjunction with eye gaze challenge responses. For a live person, the head pose changes correspond to an adjustment of the eye gaze to maintain a visual focus on the device screen, thereby indicating that the subject is likely a real human user. Conversely, if a prebuilt three-dimensional (3D) or two-dimensional (2D) representation of a subject is used, the head pose change would appear with a shift in eye gaze away from the device screen, such that a determination may be made that the image of the subject is likely a spoof representation.

The implementations of the present disclosure can therefore facilitate implementation of spoof detection using resource-constrained environments, such as a mobile user device, without the need for an additional device. By allowing a quick discrimination between captured images of a live person and captured images of a spoof alternative representation, additional processing can be preemptively terminated, thereby creating an additional layer of security.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
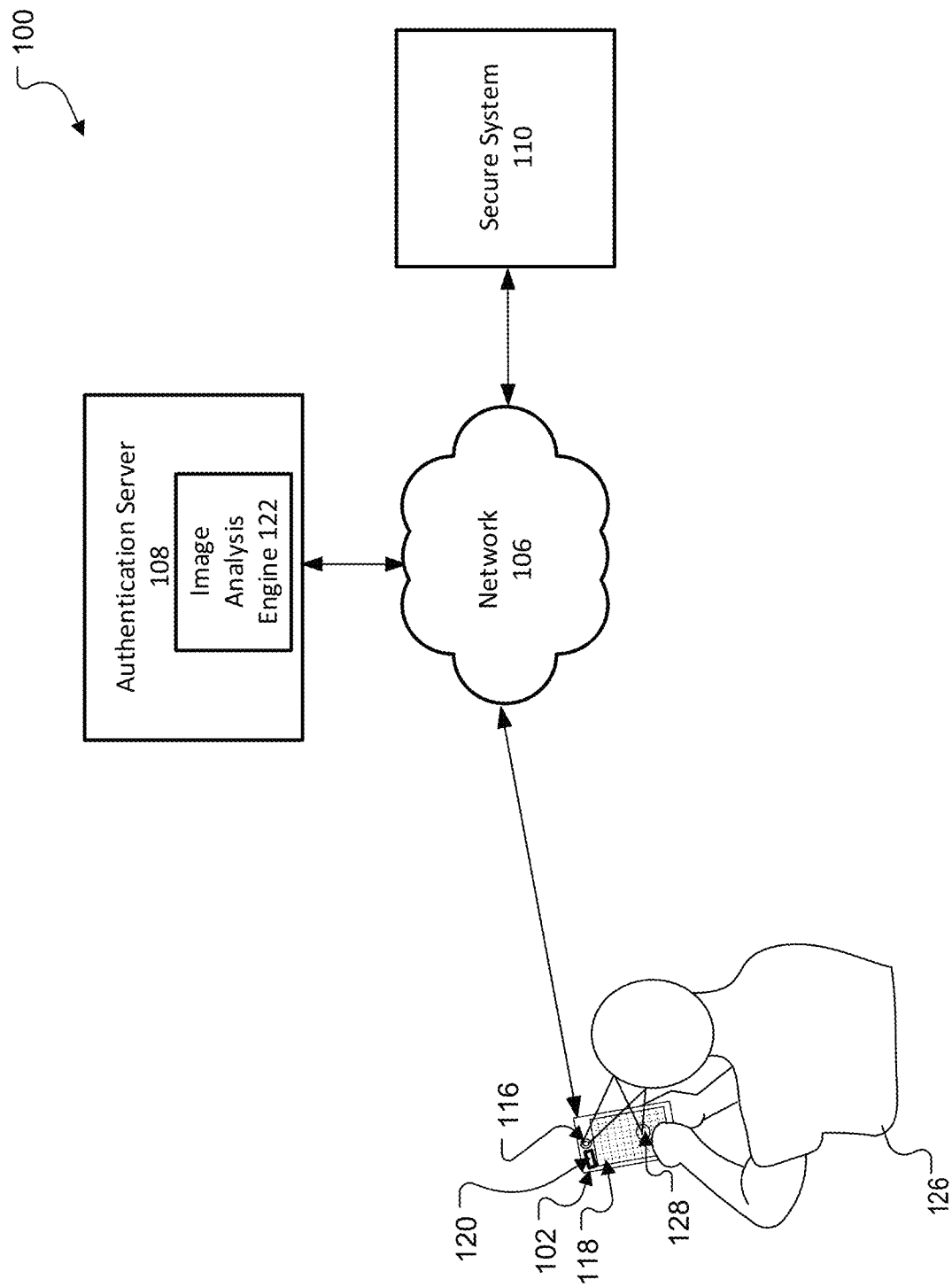
FIG. 1 depicts an example architecture in which the implementations of the present disclosure may be used.

Implementations of the present disclosure are directed to spoof detection using challenge responses. More particularly, implementations of the present disclosure are directed to capturing images of a subject subsequent to providing instructions to the subject to perform particular head movements, generating a metric that is indicative of both an extent of change in head pose as well as an extent of fixation of eye gaze, determining, based on a comparison of the metric to a threshold that the subject is a live person, and in response to determining that the subject is a live person, initiating an authentication process to authenticate the subject.

To provide further context for implementations of the present disclosure, some biometric authentication systems can authenticate a subject, for example, based on recognizing the subject's head pose, head movement, and eye gaze in response to particular instructions. Such reactions of a subject—also referred to as "challenge responses" can be used to counter presentation attack instruments (PAIs, or "spoofs") such as rigid or non-rigid 3D/2D masks. Biometric authentication systems can capture one or more images of a subject, and can execute corresponding analysis on the captured images of the subject's response to particular instructions (e.g., tilting the head in a particular way). Malicious attempts to breach the security of such a biometric authentication system can include presenting an alternative representation of a live person (e.g., a human wearing a 3D mask corresponding to the live person, or a 2D simulation of the live person displayed on a screen) replicating a similar response The technology described herein improves robustness of spoof detection by detecting such sophisticated spoof attacks. Specifically, the technology tracks variations in head pose of a subject in accordance with a presented prompt, together with tracking the eye gaze direction to determine liveness. In some cases, when a user is prompted to move the head in a certain way (e.g., yaw and pitch head movements), the user is likely to continue staring in a particular direction (e.g., the screen of a mobile device where the prompt appeared) rather than moving the eye gaze commensurately with the head movement. As such, for a live user performing such head movements, the eye gaze direction is expected to be relatively fixed even when the head moves significantly. In some other cases, for example if the user is prompted to perform a roll movement of the head while staring at a particular optical target on the screen of a device, the eye gaze direction also changes with the head movement. On the other hand, for certain PAIs such as 3D masks with fixed eyes, the eye gaze typically shifts with the head movement in a fixed way. The technology described herein is focused on tracking head movements together with movement-specific eye gaze shifts and combining information gleaned from both to discriminate live users from PAIs/spoofs.

In some implementations, a user is actively prompted to perform head movements while fixing the gaze on the device screen or a portion of a device screen. In some implementations, the user naturally looks at the screen even when not actively prompted to do so. By leveraging a score that accounts for both amount of head movement and movement-specific gaze shifting, the technology described herein can improve accuracy of spoof detection by better discriminating live humans from PAIs such as 3D masks.

In some implementations, the technology described herein can track the continuity of challenge response movements to further improve spoof detection. For example, in response to a prompt to tilt the head with respect to at least one of a yaw, a pitch and a roll, while looking at an optical target displayed on the device screen, a live user is generally able to do so by smoothly changing the head position, transitioning from an initial position, through intermediate positions, to a final position, while continuously looking at the optical target. This typically results in low variations in eye gaze direction. Conversely, if there are abrupt transitions between head positions and/or high variations in eye gaze, a determination may be made that the image of the subject is likely a spoof representation and the subject, indicating that a malicious access attempt is likely being made.

Depending on determining that the subject is a real human being or a spoof, a subsequent process, such as an underlying authentication can be allowed to proceed or preemptively aborted, respectively. In view of the above context, implementations of the present disclosure improve security and reliability of biometric authentication systems that rely on recognizing features extracted from challenge response images.

FIG. 1 depicts an example architecture 100 in accordance with implementations of the present disclosure. In the depicted example, the example architecture 100 includes a user device 102, a network 106, an authentication server 108, and a secure system 110. In the depicted example, a subject 126 interacts with the user device 102. In some implementations, the user device 102 can communicate with the authentication server 108 and the secure system 110 over the network 106. The network 106 includes one or more of the following: a local area network (LAN), wide area network (WAN), the Internet, a virtual private network (VPN), etc., or a combination thereof. The network 106 connects user devices (e.g., the user device 104, or the user device 102, etc.), the authentication server 108, and the secure system 110. In some implementations, the network 106 can be accessed over a wired and/or a wireless communications link.

In some implementations, the user device 102 can include any appropriate type of computing devices such as a desktop computer, a laptop computer, a handheld computer, a tablet computer, a personal digital assistant (PDA), a cellular telephone, a wearable device (e.g., smart watch or smart glasses), a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the user device 102 can be a mobile device, a tablet or another handheld or worn computing device. The user device 102 can be used for various purposes that require authenticating subjects 126 via one or more biometric authentication processes. For example, the user device 102 can be used to authenticate a user for one or more services (e.g., a payment processing service) that are available to the subject 126 via an application executing on the user device 102. The application executing on the user device 102 can require the subject 126 to be authenticated via a biometric authentication process before allowing access to a secure system 110 associated with requested services. In some implementations, a biometric authentication process that is based on tracking head pose to eye gaze correspondence from a live user and may require image capture of the subject 126 during response challenges.

The user device 102 (e.g., mobile device) can include a camera 116 that can be configured to capture images of the subject 126 interacting with the user device 102. The user device 102 can include a display panel 118 (e.g., a touch screen) that allows a subject 126 to interact with the user device 102, e.g., performing a payment process on the mobile device. In some implementations, the display panel 118 can display one or more RGB (red green blue) images as an optical target 128 for the subject 126. The optical target 128 can fill the entire area of the display panel 118 (e.g., the entire display panel 118 can display a particular color) or a portion of the display panel 118 (e.g., a portion of the display panel 118 can display a geometrical shape of a particular color) within a preset grid. The display panel 118 can include a grid that can be divided in multiple cells (e.g., display regions of equal size). The cells can be grouped in multiple columns and multiple rows. An optical target 128 with one or more distinctive features (e.g., animations of head movements illustrating a requested challenge response) can be displayed at a selected location or can be displayed within any cell of the grid.

The mobile device can use the camera 116 to capture one or more images of the head and eyes of the subject 126. The captured images can be analyzed to identify head pose changes in parallel to eye gaze fixation on the optical target. The images captured by the user device 102 can be analyzed using an image analysis engine (e.g., image analysis engine 120 or 122). For example, the image analysis engine 120 or 122 can analyze portions of images corresponding to regions of interest including the entire head of the subject 126 to determine whether the subject 126 is an alternative representation of a live person (e.g., a picture or a video illustrating a different person). For example, the head pose to eye gaze correspondence can be determined between two or more images corresponding to different head poses. It may then be determined whether the eye gaze is maintained with a significant change in head pose, and a liveness determination made accordingly. The image analysis engine 120 or 122 can perform liveness determination based on comparisons to predicted head poses and a predicted eye gaze direction. The image analysis engine 120 or 122 can perform liveness determination based on comparisons to a metric that combines a detected change in head movement and a detected change in eye gaze movement, the metric can be compared, for example, with a preset threshold condition. If the, the metric exceeds the preset threshold, it can be determined that the subject is likely being an actual human user, and additional authentication/verification steps to allow/prevent access to an underlying system can be invoked accordingly.

In some implementations, the image analysis engine 122 can be located at a remote location with respect to the user device 102. For example, the image analysis engine 122 can be implemented on a server 108 that is remotely located with respect to a user device 102 that captures the images. As shown in FIG. 1, for example, the image analysis engine 122 can be implemented on the authentication server 108. In such cases, the user devices 102 can communicate with the image analysis engine 122 over one or more networks 106. In some implementations, at least a portion of the image analysis engine 120 can be located on the user device 102. In some implementations, the image analysis engine 120 can implement a machine-learning model trained to discriminate between images of live people and images of alternative representations of the live people. In some implementations, the user device 102 can include an image analysis engine 122 that can discriminate between images of alternative representations of the live people and images of live human users based on a previously trained machine-learning model.

In some implementations, the authentication server 108 includes at least one server and at least one data store. In the example of FIG. 1, the authentication server 108 is intended to represent various forms of servers including, but not limited to a web server, an application server, a proxy server, a network server, and/or a server pool. In general, server systems accept requests for application services and provide such services to any number of client devices (e.g., the user device 102 over the network 106).

In accordance with implementations of the present disclosure, and as noted above, the authentication server 108 controls whether user device 102 can have access to the secure system 110. For example, the image analysis engine 120, 122 can determine that the captured images of the subject 126 correspond to an alternative representation of a live person. Alternative representations of a live person can be an indicator of a malicious attempt of unauthorized access to the secure system 110, in which the perpetrator of the attempt points the user device 102 towards a high quality photograph of an authorized subject that is printed on paper, or a recorded video of the authorized subject displayed on a high-resolution display panel. In response to determining that the subject 126 is an alternative representation of a live person, the image analysis engine 120, 122 can preemptively prevent any of the images to be further processed by the authentication server 108, thereby controlling access to the secure system 110. If the image analysis engine 120, 122 determines that the images of the subject 126 correspond to a live person, an authentication process based on one or more images of the subject 126 can be initiated (e.g., at the authentication server 108) to determine if the live person is authorized to access the secure system. For example, after determining the liveness detection result, the user device 102 can send the liveness detection result to the authentication server 108 over a network 106. Based on the liveness detection result, the authentication server 108 can allow or prevent access to the secure system 110.

Figure 2A:
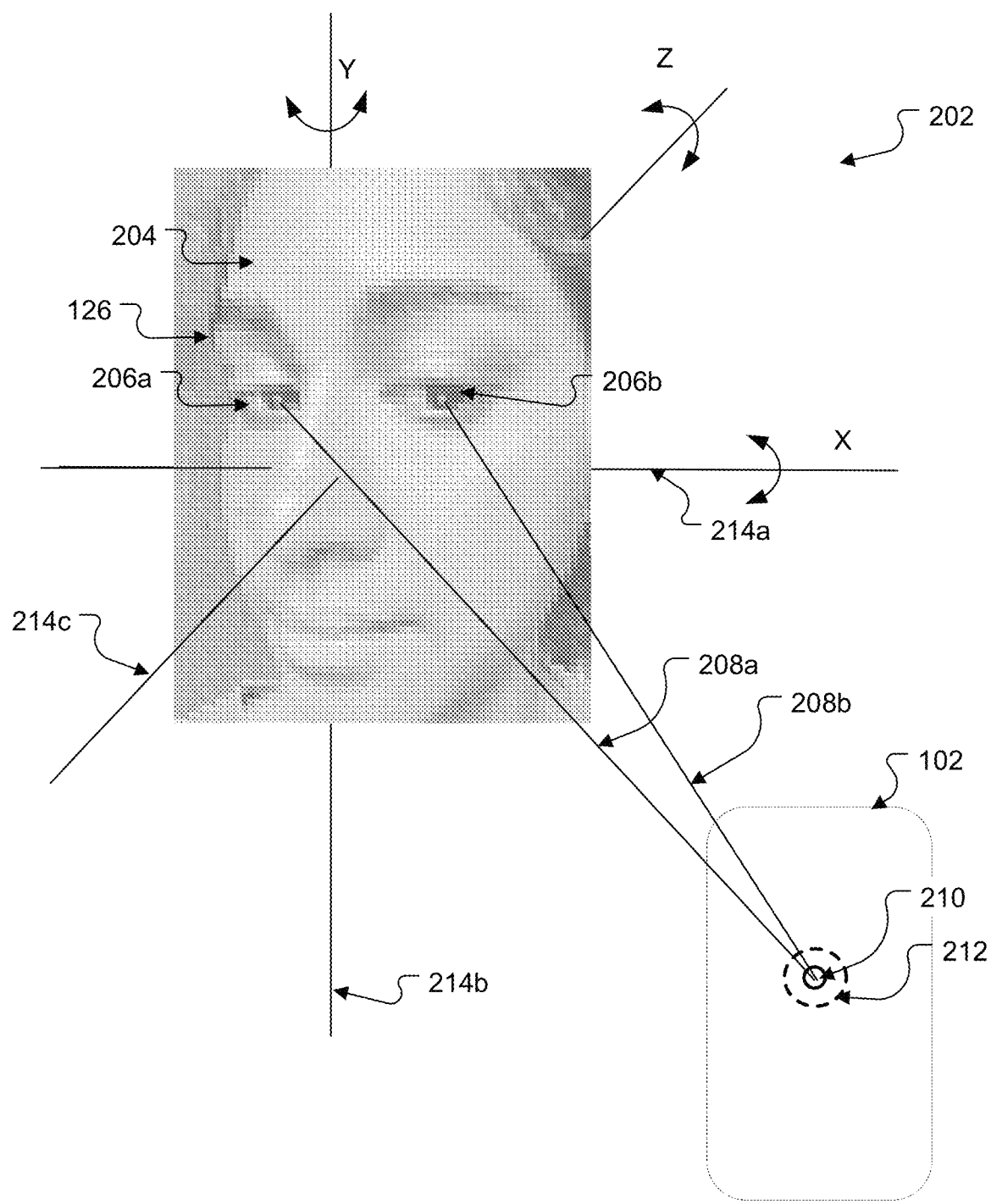
FIGS. 2A and 2B depict examples of head pose to eye gaze correspondences for a real human users in accordance with implementations of the present disclosure.
Figure 2B:
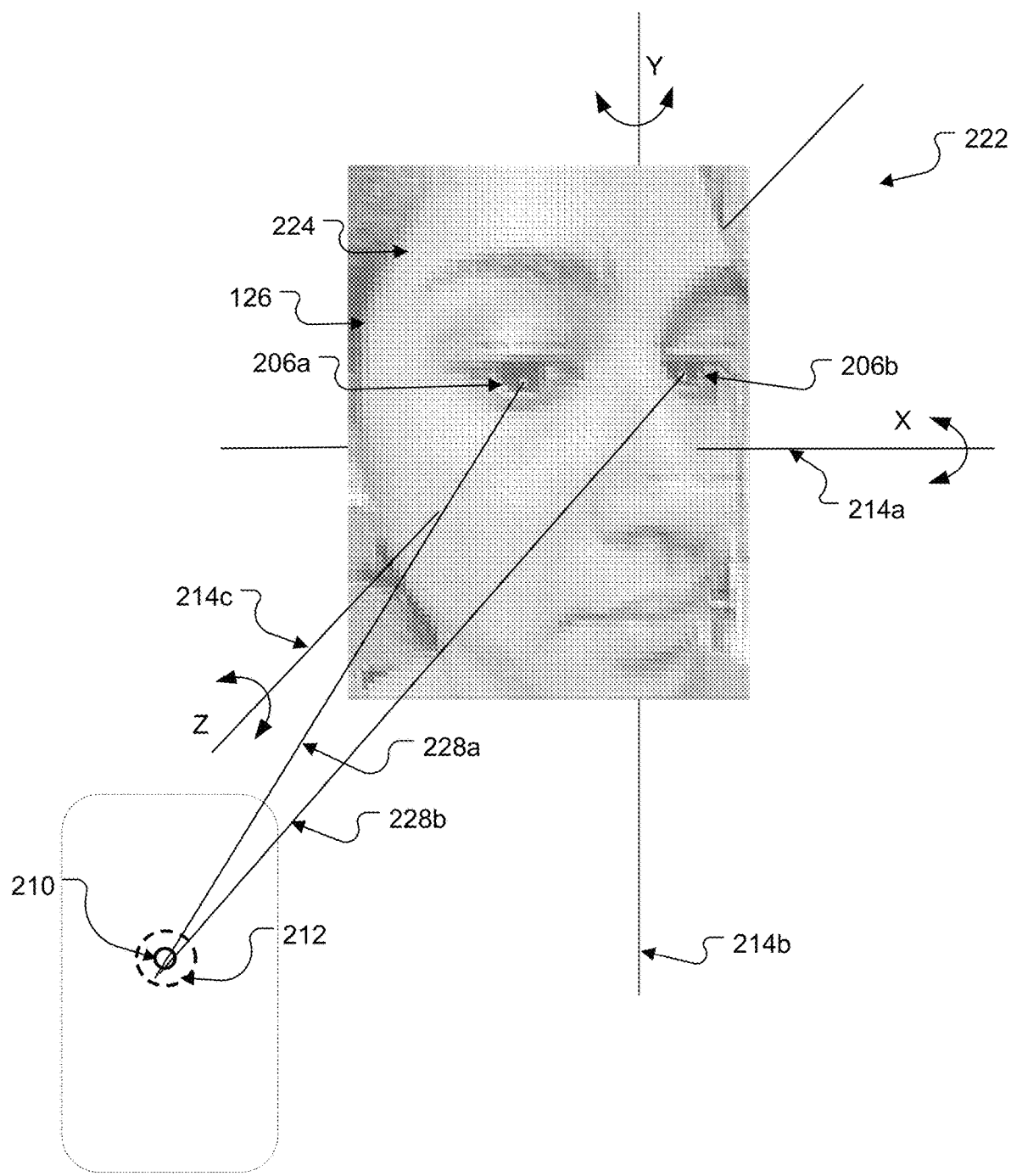

FIGS. 2A and 2B show examples of images 202, 222 of challenge responses of a live subject 126 during interactions captured by a user device 102. As illustrated in FIG. 2A, an image 202 of the subject 126 can illustrate a subject head pose 204 with the eyes 206a, 206b having eye gaze directions 208a, 208b focused on an optical target 210 displayed by the user device 102. The user device 102 can be held at a comfortable distance from the subject 126, based on the vision of the subject 126. Considering a constant natural or corrected vision of the subject 126, the distance and the angle between the user device 102 and the head 204 of the subject 126 can vary within particular ranges, depending on the head tilts prompted on the screen of the user device 102, during the authentication sessions. For example, a pitch range for a subject 126 could be from approximately 43 degrees down to approximately 66.5 degrees up, the yaw range could be could be from approximately 48 degrees left to approximately 48 degrees right, and a roll range could be could be from approximately 66 degrees left shoulder to approximately 66 degrees right shoulder.

The head position 204 can be determined by using eye landmarks (e.g., intraocular distance) and facial landmarks (e.g., nose, mouth corners) relative to the axes XYZ of a Cartesian system of coordinates 214a, 214b, 214c. The left eye 206a and the right eye 206b are considered to be oriented according to corresponding gaze directions 208a, 208b focused on the optical target 210 displayed by a user device 102. The gaze direction 208a, 208b can be determined using a deep learning based method. The deep learning based method may include face detection for finding faces, extracting facial landmarks from the detected faces using key points to locate the eye regions, and performing detection of eye state (open, closed) for the eyes in the detected eye regions. If eyes are closed, the deep learning based method can indicate that insufficient or inappropriate data is provided and no decision can be made. In some implementations, a head pose estimation is to provide input for a pretrained gaze estimation model that can indicate the gaze direction 208a, 208b. In some implementations, the gaze direction 208a, 208b can be approximated by stereo triangulation of the distribution of specular reflections (e.g., glint points) about the image center of corneas 318a, 318b. The corneas of the left eye 206a and the right eye 206b, respectively include an ellipsoid shape, having limbus as the boundary between the corneas the scleras. Since the corneas include ellipsoid (convex) shapes, the field of view of the corneal imaging system is bounded by the incident light rays that are reflected by the limbus. The limbus defines the outer limit of the reflector area (corneas) of the left eye 206a and the right eye 206b, respectively. In some implementations, the corneas include a substantially circular shape with a radius of approximately 5.5 mm. Even in the extreme case when the gaze direction 208a, 208b is perpendicular to the optical axis of the camera 116, the diameter of the limbus is approximately 11 mm.

As illustrated in FIG. 2B, an image 222 of the subject 126 can illustrate another subject head pose 224 (e.g., illustrating a yaw movement towards opposite side) with the eyes 206a, 206b having eye gaze directions 228a, 228b focused nearby the optical target 210 within an acceptable eye gaze variation range 212, around the optical target 210 displayed by the user device 102. In some implementations, the captured sequence of images 202, 222 can be used to determine a correspondence between head pose 204, 224 and eye gaze 208a, 208b, 228a, 228b based on the requested type of head movement (e.g., yaw, pitch, and/or roll) to determine whether the captured sequence is legitimate, or if it might be coming from an attack source.

In some implementations, the face in the image can be cropped (e.g., using face landmarks) and the amount of head pose change (e.g., as represented by yaw and/or pitch change) estimated between multiple images. In some implementations, two images with the maximum change can be selected to continue the analysis. For example, if the change is not above a predefined threshold, an early termination can be triggered based on a determination that the images likely represent a 2D static spoof. Eye landmarks are then used on the two selected images to crop the eye regions and these eye crops along with face crops can be used to determine a metric or score that increases with the amount of head pose change but decreases with the amount of eye gaze shift. In some implementations, the eye crops and face crops (or the selected images in their entireties) are fed into two separately or jointly pre-trained convolutional neural networks (CNNs) or machine-learning (ML) classifiers that use particular features to predict head pose/eye gaze change probabilities. The predictions of these CNNs can then be used to calculate a liveness classification score. In some implementations, the liveness score $M_3$ can be calculated as:

$$M_3 = w1 * M_2 + w2 * (1/M_1)$$

wherein $M_2$, the head-pose change score, and $M_3$, the eye-gaze score, are generated by the trained ML models or CNNs. If the liveness score is larger than a predefined threshold, the subject of the images can be classified as a live human, and conversely if the liveness score is smaller than the predefined threshold, the subject can be classified as a spoof or likely PAI. In some implementations (e.g., when the user is prompted to perform a roll head movement), there is a shift in eye gaze direction for the user to continue to stare at a particular location on a device screen. In such cases, the liveness score can be computed as:

$$M3 = w1 * M2 + w2 * M1$$

In some implementations, discriminating between live users and PAIs based on such head pose and eye gaze correspondences can improve security of a system protected by a biometric authentication process, even when the attacker uses attack schemes based on sophisticated 3D face representations.

Figure 3A:
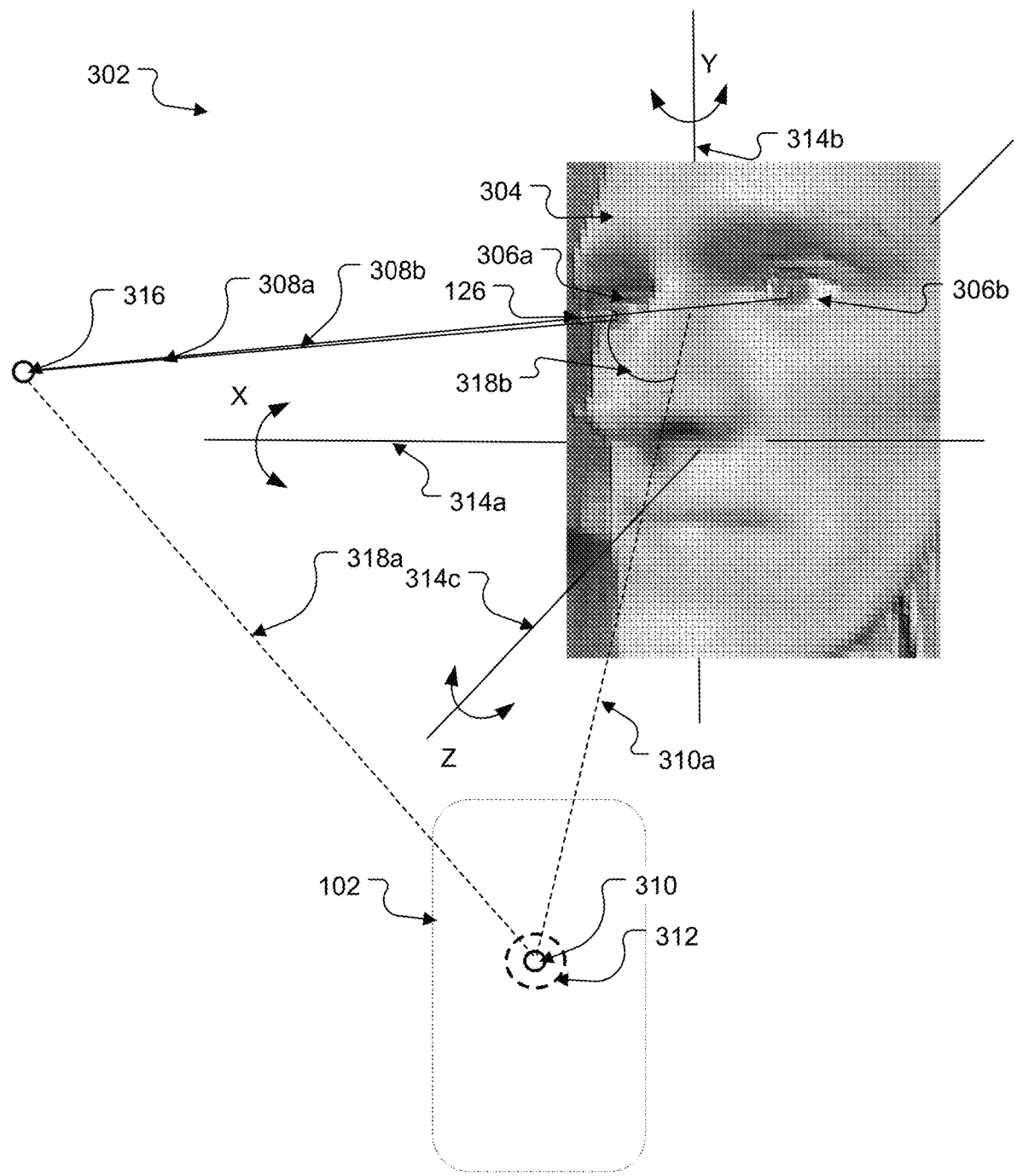
FIGS. 3A and 3B depict examples of head pose to eye gaze correspondences for a spoof representation in accordance with implementations of the present disclosure.
Figure 3B:
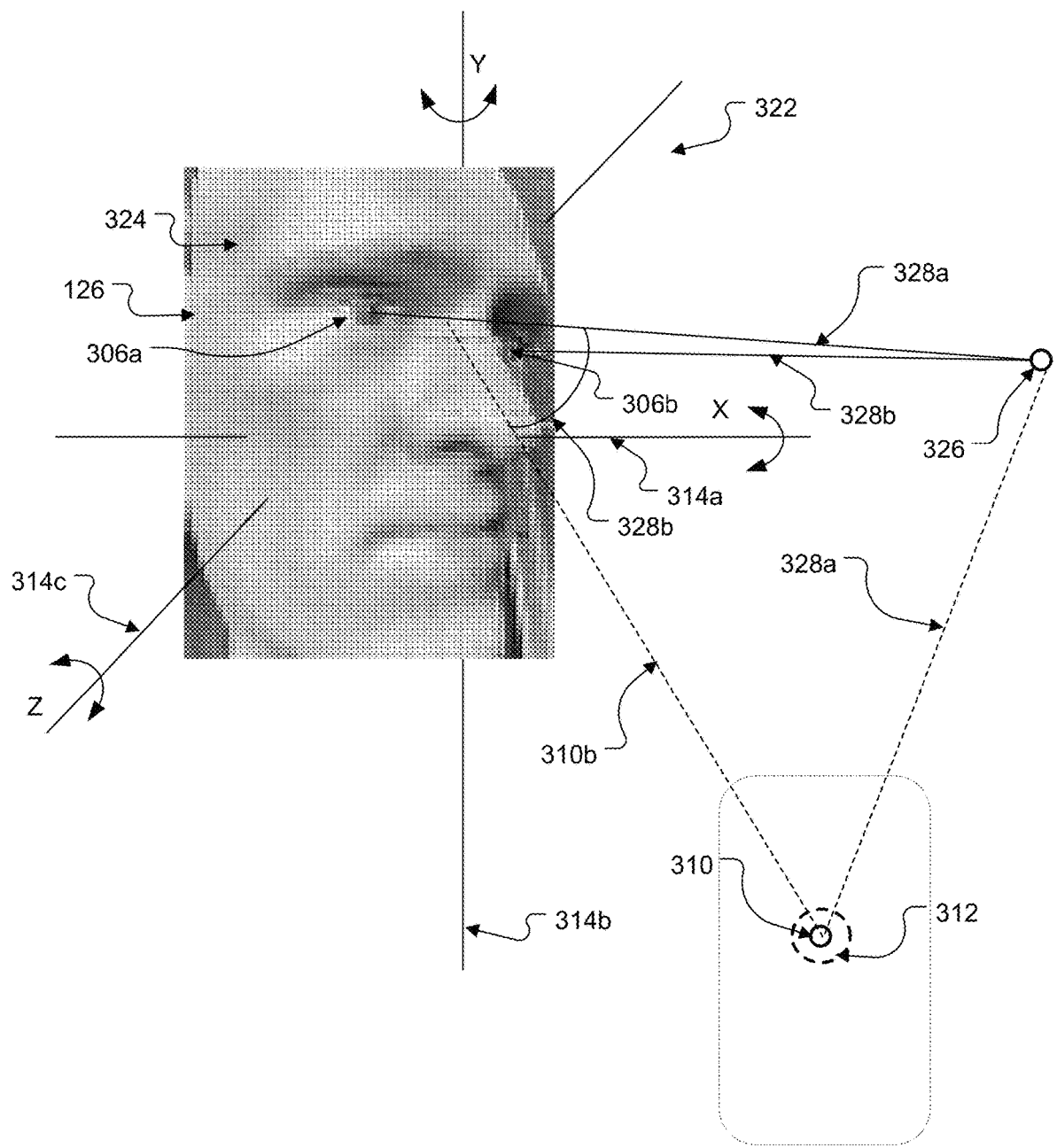

FIGS. 3A and 3B show examples of images 302, 322 of challenge responses of a 3D spoof representation of a subject 126 captured by a user device 102. As illustrated in FIG. 3A, an image 302 of the 3D spoof representation of the subject 126 can illustrate a head pose 304 that can match or be different from a head pose requested by the user device 102. In the image 302 of the 3D spoof representation of the subject 126, the eyes 306a, 306b have eye gaze directions 308a, 308b focused on a point 316, different from the optical target 310, displayed by the user device 102. The head position 304 can be determined by using eye landmarks (e.g., intraocular distance) and facial landmarks (e.g., nose, mouth corners) relative to the axes XYZ of a Cartesian system of coordinates 314a, 314b, 314c. The left eye 306a and the right eye 306b are considered to be oriented according to corresponding gaze directions 308a, 308b focused on a point 316, spatially distanced by a distance 318a, from the optical target 310, the distance being larger than a threshold distance (e.g., 5 cm, 10 cm or 15 cm). An angle 318b formed by the eye gaze directions 308a, 308b focused on the point 316 and a predicted eye gaze 310a focused on the optical target 310 can be significantly higher than a set threshold angle (e.g., 5°, 10° or 15°).

As illustrated in FIG. 3B, another image 322 of the 3D spoof representation of the subject 126 can illustrate another subject head pose 324 (e.g., illustrating a yaw movement towards opposite side that can correspond to another head pose requested by the user device 102). In the image 322 of the 3D spoof representation of the subject 126, the eyes 306*a*, 306*b* have eye gaze directions 328*a*, 328*b* focused on a point 326, spatially distanced 328*a* from the optical target 310 at an angle 328*b*. In some implementations, the captured sequence of images 302, 322 can be used to identify a discrepancy between detected eye gazes 308*a*, 308*b*, 328*a*, 328*b* and predicted eye gazes 310*a*, 310*b* based on the requested type of head movement (e.g., yaw, pitch, and/or roll) to determine that the captured sequence is coming from an attack source. Because the eye gaze shift in the example of FIGS. 3A and 3B is high, the liveness score is likely to be lower than the predetermined threshold—thereby causing the subject of the images to be classified as a likely PAI.

In some implementations, the spoof detection can be further improved by tracking how dynamic the head pose changes are. For example, face and eye landmarks can be used in some implementations to crop faces and eye regions for each image in the captured image sequence, and pre-trained CNNs can be used to predict head pose and eye-gaze predictions for each image in the sequence of images. For a live user, the head pose estimations for each image typically show a continuous and smooth transition of the predicted values with slight to no variation in eye gaze prediction values. However, for a PAI like face swaps/2D static spoofs, the head pose estimations from one image to another is likely to show an abrupt transition of the predicted values with high to no variation in eye gaze prediction values. Therefore, a smooth and natural movement of head pose can be used to determine whether a subject is a live human being, and the underlying spoof detection process can potentially be made more robust against face swaps/2D static spoof attacks where such continuity of the gesture is absent.

Figure 4:
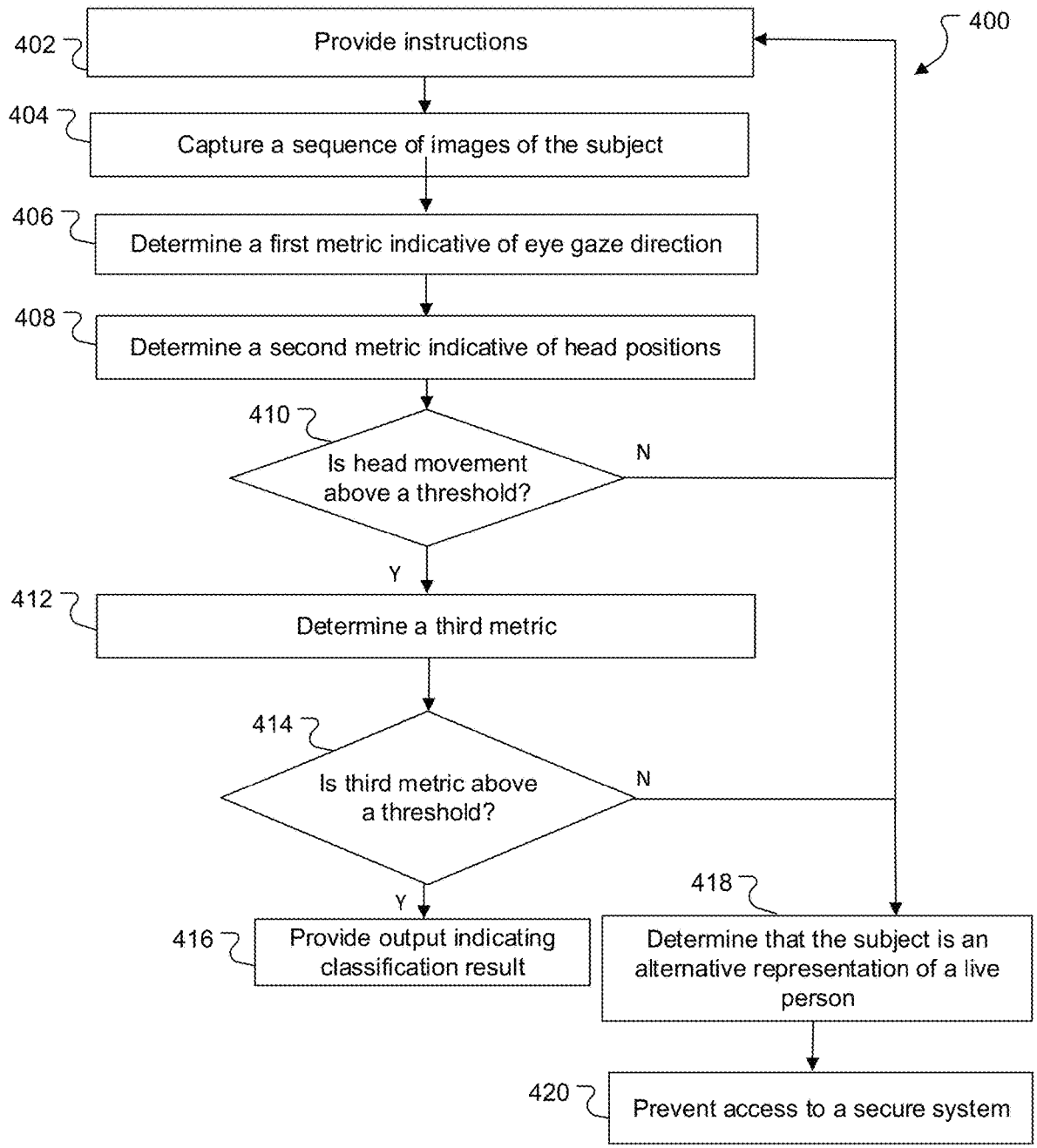
FIG. 4 is a flowchart of an example process that can be executed in accordance with implementations of the present disclosure.

FIG. 4 shows an example of a process 400 for liveness detection. In some implementations, at least a portion of the process 400 can be executed by one of more components of the example architecture 100 described with reference to FIG. 1. In some implementations, at least a portion of the process 400 may be executed by the image analysis engine (e.g., 120 or 122) depicted in FIG. 1. In some implementations, at least a portion of the process 400 may be executed by one or more servers (e.g., authentication server 108 or computing devices in a distributed computing system) in communication with remote components such as one or more processing devices disposed within a user device (e.g., the user device 102).

Instructions are provided by a device to a subject to perform one or more head tilts while fixating the eye gaze on a portion of a device screen (402). In some implementations, a user device provides visual and audio commands instructing the subject to execute of the one or more head tilts while displaying an optical target. For example, the user device can display schematic representations (e.g., icons) of the head tilts on a display screen of the user device within a preset portion of the display screen (e.g., a center of the display screen) or according to a (randomized) sequence of two or more different portions of the display screen (e.g., a left top corner, a right top corner, a left bottom corner, a right bottom corner, and a center of the display screen). The user device can prompt the subject to follow and mirror the movements displayed on the display screen of the user device. The head tilts can be, for example, with respect to yaw, roll, or pitch, or a combination of any two of them. The mobile device can display an animated image of an avatar of the subject, as an optical target in a user-friendly preview experience. In some implementations, the user device can direct the user to adjust a distance and a position relative to the camera to optimize visualization of the entire head of the subject (e.g., to maximize signal to noise ratio and to bring entire head of the subject in a capturing field of the camera of the user device, including a padding region). The user device can adjust a luminosity of the display or a light source to optimize visualization of the head and/or eyes of the subject.

A set of images of the face of the subject is captured as a response of the subject to the instructions to perform head tilts (404). In some implementations, the set of images of the face of the subject is captured within a predetermined time period after the instructions were provided. The predetermined time period can be a few seconds long, such as 2 to 5 seconds long. During the predetermined time period, multiple images can be captured at a predetermined frequency (e.g., 1 kHz or higher) that ensures capture of at least one image without a head tilt and one image with the head tilt. In some implementations, the set of images includes an interim image that represents a transition between the image without the head tilt and the image with the head tilt. For example, at least one image can be captured for a neutral head pose (image without the head tilt that the subject is asked to perform), at least one image can be captured during the transitional phase, and at least one image can be captured for the particular head pose with complete head tilt. In some implementations, at least one image is captured before the instructions are provided, which can then be used as a reference image. The reference image can include one or more reference points or landmarks for extracting/cropping a region of interest. Using reference points (e.g., facial landmarks), the images can be cropped to extract the face of the subject illustrating different head poses (e.g., yaw, roll, or pitch change) and select two images with the maximum head pose change and, in some implementations, a transitional image. The images illustrating head poses can be further cropped, using the facial landmarks, to extract the eye regions. The facial landmarks can include, for example, the center of the eyes, location of eyebrows, locations of various portions of the lips, location of the nose, or any portion/characteristic of the face that can be used as a reference point for determining the locations/dynamics of the wrinkles, skin lines for the purposes described herein. The regions of interest (e.g., entire face and eye regions) can be determined based on the facial landmarks. For example, the eye centers can be used as reference points to identify the eye region in a face (e.g., using a bounding box that encompasses the eye centers). In some implementations, the entire face can constitute a region of interest.

A first metric indicative of an amount of change in eye gaze directions of the subject during the head movement is determined from the set of images (406). The first metric is substantially proportional to the amount of change in eye gaze directions. In some implementations, the cropped eye regions of the selected images of head poses are fed into parallel or jointly pertained convolutional neural network (CNNs) or machine learning (ML) classifiers to predict eye gaze change probabilities within an acceptable eye gaze region around the displayed optical target (e.g., 1-2 cm in all directions outside the optical target margins). For example, the cropped eye regions of the selected images of head poses can be processed to extract stereo correspondence images that include matching source specular reflections or glints by source elements (e.g., target object and one or more additional environmental objects) across views. The glint locations on the corneal surface of both eyes can be reconstructed by stereo triangulation. The locations can be used to parameterize the corneal surface: the surface may be parameterized as a sphere with center and radius from the locations of three non-planar glint points. The non-planar glint points are defined as approximate bounds to the physical locations of the target object and the environmental objects. Stereo reconstruction is based on the acquisition of multiple images of the same surface points from different perspectives corresponding to the left and the right eye. The pupil image center and the glint points can occur on different corneal surface points for different camera views. A stereo reconstructed glint point can be projected as being within the eye rather than on the cornea surface. In some implementations, the structure locations within the eye of matched features can be determined by stereo triangulation. The stereo reconstructions can be treated as approximate bounds to the actual locations of the target object and the environmental objects because light ray distortion by the corneal surface distorts the image. The reflection features computed by image feature triangulation can be distorted and closer to the corneal surface than in actuality. In some implementations, the image location of the reflection features can be corrected by the refraction followed by stereo reconstruction. In some implementations, the stereo reconstructed glint locations and the locations of the apparent pupil image at the corneal surface can be used to rectify the stereo correspondence images based on corneal curvature. The pupil image being refracted by the cornea from the actual location and the described approximations can be useful as bounds on the stereo correspondence images to update the values according to the inner eye structure. The rectified stereo correspondence images include a translational offset about the line of sight (e.g., eye gaze direction) that can be used to reconstruct an eye gaze focus including distance (e.g., depth estimate) and position of optical targets relative to the eyes of the subject. For example, the location of an object can be computed for stereo rectified features from the intersection point of the back traced ray with a representative feature sphere, a mathematical construct that can be derived from an initial calibration process. For stereo conjugate features, the location can be derived from the intersection point of stereo matched rays; the computation can be used to refine the representative feature sphere. The depth estimate can be based on a realistic catadioptric model of the eye (e.g., considering anatomical eye dimensions and geometries), derived from physiologic optics, to accurately determine the optical axes and the corresponding visual line of sight. The computations needed for this derivation follow from the specular reflections from the cornea of the optical target displayed by the user device and the associated diffused reflections from the internal structures of the eye. The first metric can be indicative of the distance (e.g., depth estimate) and position of optical targets relative to the change in the position of eyes of the subject between multiple head poses.

A second metric indicative of an amount of change in head positions of the subject during the head movement is determined from the set of images (408). The second metric is substantially proportional to the amount of change in head positions during the head movement. In some implementations, the cropped head regions (e.g., entire face) of the selected images of head poses are fed into parallel or jointly pertained convolutional neural network (CNNs) or machine learning (ML) classifiers to predict head positions (head tilt) probabilities. In some implementations, the second metric can be indicative of the dynamic nature of the head pose changes. For example, pre-trained CNNs can be used to predict head poses and eye-gazes for each image in the sequence of captured images, based on an expected head movement velocity. For a live user, the head pose estimations for each image show a continuous and smooth transition of the predicted values, while predicting slight to no variation in eye gaze prediction values. A presentation attack instrument, such as face swaps or 2D static spoofs can present an abrupt transition of the head pose from an initial pose to a final pose. The second metric can also include a real numerical value within the interval 0 to 1 or as a percentage. A second metric set to 0 (0%) represents an abrupt transition from the initial head pose to a particular head pose, absence of a head pose change or an identification of a head movement that does not match the prompted head movement (e.g., subject performs a head roll instead of a head pitch). A second metric set to 1 (100%) indicates a continuous transition from the initial head pose to the requested head pose with a head inclination or rotation angle substantially equal to a maximum movement angle for the prompted type of movement (e.g., roll, pitch or yaw).

It is determined whether the head movement exceeds a head movement threshold (410). In some implementations, determining whether the head movement exceeds the head movement threshold includes comparison of a landmark position distance between the selected images to the head movement threshold (e.g., a distance threshold). In some implementations, determining whether the head movement exceeds the head movement threshold includes comparison of a head axis angle variation between the selected images relative to at least one of the Cartesian axes corresponding to the head movement and the head movement threshold (e.g., an angle threshold). If it is determined that the head movement is below the head movement threshold, the images can be recaptured or it can be determined that an alternative representation of a live person might be interfering with the process 400 for liveness detection (418).

If it is determined that the head movement is above the head movement threshold, a third metric indicative of a likelihood that the subject is a live person is determined based at least on the first metric and the second metric (412). The third metric (liveness score) can be a weighted sum of the second metric and the first metric or an inverse of the first metric, depending on the pre-defined instructed head and eye gaze movements. For example, in response to a request to execute yaw and pitch head movements, a live user can present a change in head movement and minimal to no change in eye gaze movement. Within the context of for yaw and pitch head movements, the third metric ($M_3$) can be computed as a sum of a first weighted value ($w_1$) of the second metric ($M_2$) and a second weighted value ($w_2$) of an inverse of the first metric ($M_1$).

$$M_3 = w_1 * M_2 + w_2 * (1/M_1)$$

As another example, in response to a request to execute a roll head movement, a live user can present a change in head movement and a change in eye gaze movement. Within the context of for roll movements, the third metric ($M_3$) can be computed as a sum of a first weighted value ($w_1$) of the second metric ($M_2$) and a second weighted value ($w_2$) of the first metric ($M_1$).

$$M_3 = w_1 * M_2 + w_2 * M_1$$

It is determined whether the third metric ($M_3$) exceeds a liveness score threshold (414). In some implementations, the liveness score threshold can be based on predicted head positions (head tilt) probabilities and predicted eye gaze probabilities. In some implementations, the liveness score threshold can be based on statistically acceptable values that can be generated based on parameters extracted from an enrolment process. In some implementations, the liveness score threshold can be based on statistically acceptable values that can be generated based on parameters extracted from multiple live users performing head tilts within anatomically acceptable ranges. In response to determining that third metric exceeds the liveness score threshold, the subject is identified as a live person (416). If the subject is identified as a live person an output can be provided indicating the liveness detection result. The output can include a trigger to enable a communication of the user device performing the liveness detection with a secure system. In some implementations, identification that the subject is a live person includes a determination that one or more metrics is above the threshold, such that the liveness measure is considered acceptable.

Alternatively, in response to determining that the third metric is below the liveness score threshold, it is determined that the subject is an alternative representation of a live person (418). In some implementations, the alternative representation of the live person can include a photograph of the live person printed on paper, or presented on a display panel. If it is determined that the subject is an alternative representation of a live person, access to a secure system is prevented (420). In some implementations, controlling access to the secure system can include preemptively preventing any of the images to be further processed by the authentication server 108, thereby controlling access to the secure system. In some implementations, controlling access to the secure system can terminate an application of the user device and/or disabling a functionality of the user device for interrupting a network communication with a secure system for a predetermined duration. Controlling access to the secure system can improve performance of an underlying biometric authentication system by filtering out spoof attacks at a front end, and thereby reducing waste of computational resources.

Figure 5:
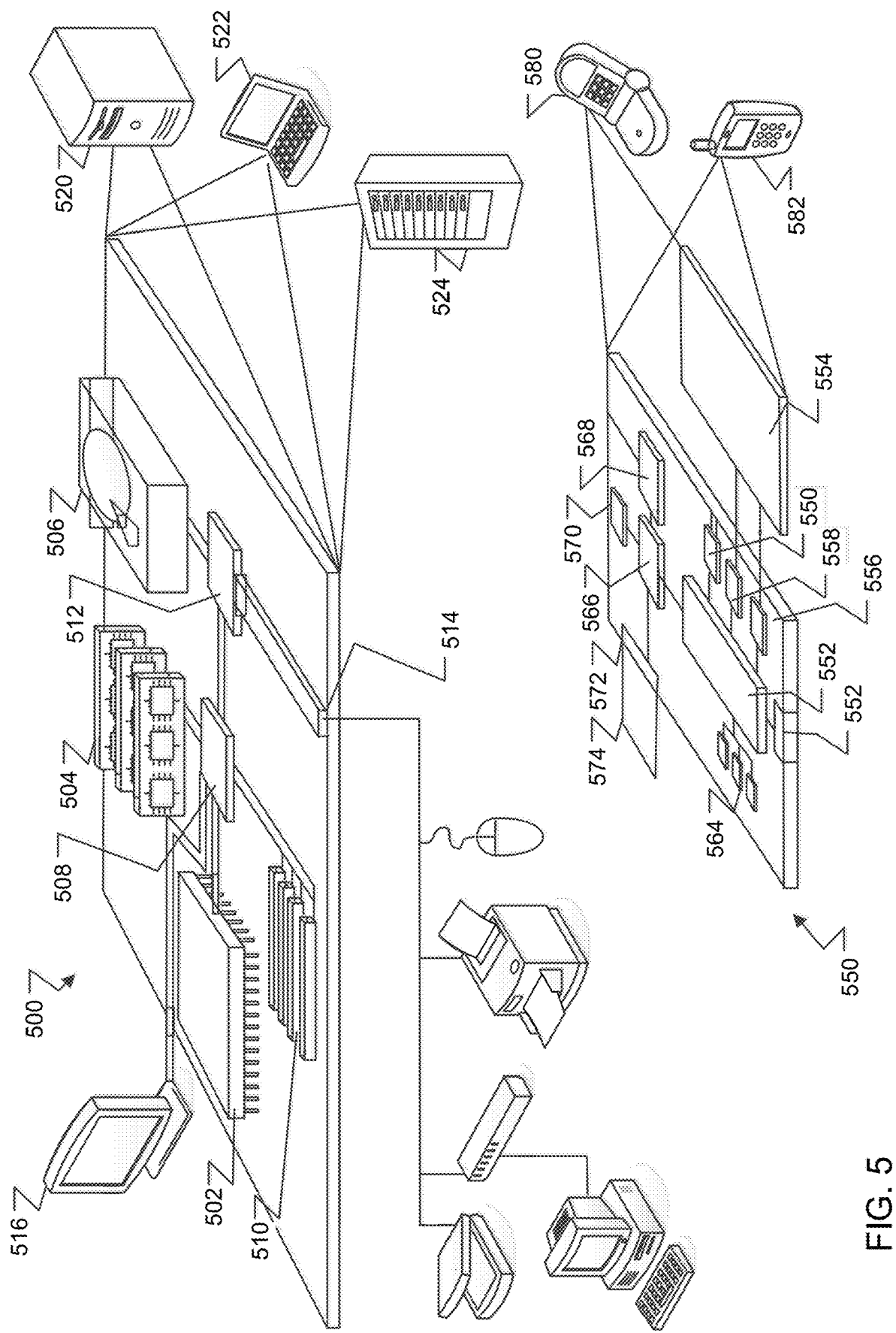
FIG. 5 is a schematic illustration of example computer systems that can be used to execute implementations of the present disclosure.

FIG. 5 shows an example of a computing device 500 and a mobile device 550, which may be used with the techniques described here. For example, referring to FIG. 1, the user device 104 can include one or more of the computing device 500, either in part or in its entirety. The user device 102 can include one or more of the mobile device 550, either in part or in its entirety. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on the processor 502.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing devices 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. For example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. The sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer, or other similar mobile device.

Figure 6:
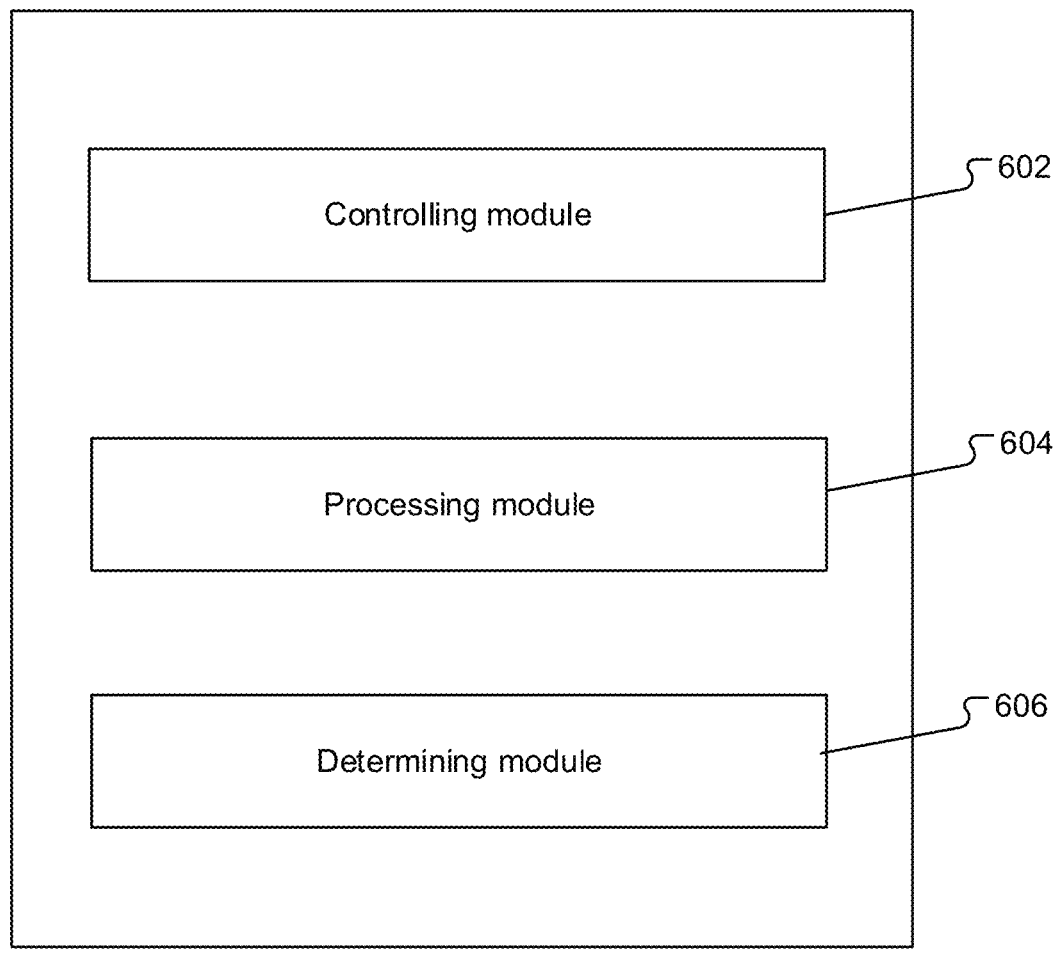
FIG. 6 depicts examples of modules of an apparatus in accordance with implementations of the present disclosure.

FIG. 6 depicts examples of modules of an apparatus 600 in accordance with one or more embodiments of the present disclosure. The apparatus can be an example of an embodiment of a system configured to perform a selfie pay biometric authentication using corneal reflections from both eyes. The apparatus 600 can correspond to the embodiments described above, and the apparatus 600 includes the following: a controlling module 602 that controls an image acquisition device to capture a sequence of images of a subject illuminated with a sequence of optical target positions in a selected optical target sequence, and the sequence of images are temporally synchronized with the illumination by the optical target sequence; a processing module 604 that processes the images using, for example, the process described with reference to FIG. 5; and a determining module 606 that determines that the subject is an alternative representation of a live person based on a rich RGBD output representation combining a depth map and input color reflections of both eyes. In response to determining that the subject is an alternative representation of a live person, the determining module 606 prevents access to a secure system.

In some embodiments, the alternative representation of the live person includes a photograph of the live person printed on paper, or presented on a display panel. In some embodiments, the alternative representation of the live person includes video replay of the live person on a display panel. In some embodiments, the determining module 606 determines that the subject is an alternative representation of a live person based on the filtered response image by: processing the filtered response image using a machine learning process trained to discriminate between filtered response images of live persons and filtered response images of alternative representations of the live persons. In some embodiments, the processing module 604 generates the rich RGBD output representation from the images of both eyes of the subject by stereo triangulation.

In some embodiments, the controlling module 602 controls the image acquisition device to capture one or more additional images using different camera settings or a different display of the optical target. The processing module 604 generates a second rich RGBD output representation from the additional images of the second subject by stereo triangulation. The determining module 606 determines that the subject is a live person based on the second rich RGBD output representation.

In some embodiments, the apparatus 600 includes an initiating module that initiates an authentication process for determining if the live person is authorized to access the secure system in response to determining that the second subject is a live person.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display panel (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 210 of FIG. 2. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A computer-implemented method comprising:
   providing, by a processor of a user device having a camera, instructions on a display panel of the user device, the instructions provided for performing a head movement;
   capturing a set of images of a subject using the camera of the user device subsequent to providing the instructions to perform the head movement;
   determining, by the processor from the set of images, a first metric indicative of an amount of change in eye gaze directions of the subject during the head movement;
   determining, by the processor from the set of images, a second metric indicative of a change in head positions of the subject during the head movement;
   determining, by the processor based at least on the first metric and the second metric, a third metric indicative of a likelihood that the subject is a live person, wherein the third metric is a weighted sum of (i) the second metric and (ii) an inverse of the first metric;
   determining that the third metric satisfies a first threshold condition; and
   in response to determining that the third metric satisfies the first threshold condition, identifying the subject as a live person.

2. The computer-implemented method of claim 1, wherein the instructions provide an optical target that is displayed by a device screen for the subject to look at, while the set of images is being captured.

3. The computer-implemented method of claim 1, wherein the first metric is substantially proportional to the amount of change in eye gaze directions.

4. The computer-implemented method of claim 1, wherein the second metric is substantially proportional to an amount of change in the head positions during the head movement.

5. The computer-implemented method of claim 1, wherein the third metric is a weighted sum of (i) the second metric and (ii) the first metric.

6. The computer-implemented method of claim 1, wherein the instructions to perform the head movement comprise instructions to perform one of: a yaw, a pitch or a roll of a head of the subject.

7. The computer-implemented method of claim 1, further comprising:
   determining a presence of at least one transitional state as a head position changes from an initial head position to a final head position; and
   determining that the head movement between the initial head position and the final head position exceeds a second threshold condition.

8. A non-transitory, computer-readable medium storing one or more instructions executable by a computer system to perform operations comprising:
   providing, by a processor of a user device having a camera, instructions on a display panel of the user device, the instructions provided for performing a head movement;
   capturing a set of images of a subject using the camera of the user device subsequent to providing the instructions to perform the head movement;
   determining, by the processor from the set of images, a first metric indicative of an amount of change in eye gaze directions of the subject during the head movement;

determining, by the processor from the set of images, a second metric indicative of a change in head positions of the subject during the head movement;

determining, by the processor based at least on the first metric and the second metric, a third metric indicative of a likelihood that the subject is a live person, wherein the third metric is a weighted sum of (i) the second metric and (ii) an inverse of the first metric;

determining that the third metric satisfies a first threshold condition; and in response to determining that the third metric satisfies the first threshold condition, identifying the subject as a live person.

9. The non-transitory, computer-readable medium of claim 8, wherein the instructions provide an optical target that is displayed by a device screen for the subject to look at, while the set of images is being captured.

10. The non-transitory, computer-readable medium of claim 8, wherein the first metric is substantially proportional to the amount of change in eye gaze directions.

11. The non-transitory, computer-readable medium of claim 8, wherein the second metric is substantially proportional to an amount of change in the head positions during the head movement.

12. The non-transitory, computer-readable medium of claim 8, wherein the third metric is a weighted sum of (i) the second metric and (ii) the first metric.

13. A computer-implemented system comprising:
one or more computers; and
one or more computer memory devices interoperably coupled with the one or more computers and having tangible, non-transitory, machine-readable media storing one or more instructions that, when executed by the one or more computers, perform operations comprising:
providing, by a processor of a user device having a camera, instructions on a display panel of the user device, the instructions provided for performing a head movement;

capturing a set of images of a subject using the camera of the user device subsequent to providing the instructions to perform the head movement;

determining, by the processor from the set of images, a first metric indicative of an amount of change in eye gaze directions of the subject during the head movement;

determining, by the processor from the set of images, a second metric indicative of a change in head positions of the subject during the head movement;

determining, by the processor based at least on the first metric and the second metric, a third metric indicative of a likelihood that the subject is a live person, wherein the third metric is a weighted sum of (i) the second metric and (ii) an inverse of the first metric;

determining that the third metric satisfies a first threshold condition; and in response to determining that the third metric satisfies the first threshold condition, identifying the subject as a live person.

14. The computer-implemented system of claim 13, wherein the instructions provide an optical target that is displayed by a device screen for the subject to look at, while the set of images is being captured.

15. The computer-implemented system of claim 13, wherein the first metric is substantially proportional to the amount of change in eye gaze directions.

16. The computer-implemented system of claim 13, wherein the second metric is substantially proportional to an amount of change in the head positions during the head movement.

17. The computer-implemented system of claim 13, wherein the third metric is a weighted sum of (i) the second metric and (ii) the first metric.

* * * * *